United States Patent
Rutledge et al.

(10) Patent No.: US 8,398,246 B2
(45) Date of Patent: Mar. 19, 2013

(54) REAL-TIME PROJECTION MANAGEMENT

(75) Inventors: James Stephen Rutledge, Durham, NC (US); Andreas Schupp, North Point (HK); QianYing Wang, Beijing (CN); Fang Xu, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 375 days.

(21) Appl. No.: 12/716,964

(22) Filed: Mar. 3, 2010

(65) Prior Publication Data

US 2011/0216288 A1    Sep. 8, 2011

(51) Int. Cl.
*G03B 21/14*    (2006.01)
*G03B 21/26*    (2006.01)

(52) U.S. Cl. ............... 353/69; 353/70; 353/94

(58) Field of Classification Search ............ 353/69–70, 353/94, 122; 345/621
See application file for complete search history.

(56) References Cited

U.S. PATENT DOCUMENTS

| | | | |
|---|---|---|---|
| 6,520,647 B2 * | 2/2003 | Raskar | 353/70 |
| 6,802,614 B2 * | 10/2004 | Haldiman | 353/69 |
| 6,963,348 B2 * | 11/2005 | Diamond et al. | 345/647 |
| 7,222,971 B2 * | 5/2007 | Akutsu | 353/69 |
| 8,038,303 B2 * | 10/2011 | Inoue | 353/70 |
| 2004/0017518 A1 * | 1/2004 | Stern et al. | 348/744 |
| 2007/0040800 A1 * | 2/2007 | Forlines et al. | 345/158 |
| 2009/0091714 A1 * | 4/2009 | Aufranc et al. | 353/70 |
| 2009/0141250 A1 * | 6/2009 | Destain | 353/69 |
| 2009/0290129 A1 * | 11/2009 | Yoshida | 353/31 |
| 2010/0128231 A1 * | 5/2010 | Furui | 353/70 |
| 2010/0306022 A1 * | 12/2010 | Plut | 705/10 |

* cited by examiner

*Primary Examiner* — Tony Ko
*Assistant Examiner* — Jori S Reilly-Diakun
(74) *Attorney, Agent, or Firm* — Brian J. Pangrle

(57) ABSTRACT

An exemplary method includes defining an environment, formulating an anti-keystoning algorithm based at least in part on the defined environment, projecting a laser image from a source to a surface of the defined environment, determining at least one vector parameter with respect to the source and the surface and correcting the laser image based on the anti-keystoning algorithm and the at least one vector parameter. Various other apparatuses, systems, methods, etc., are also disclosed.

23 Claims, 8 Drawing Sheets

REAL-TIME PROJECTION MANAGEMENT

TECHNICAL FIELD

Subject matter disclosed herein generally relates to techniques for managing projected images.

BACKGROUND

Distortion, such as the so-called keystone or tombstone effect, occurs when an image is projected onto a surface at an angle that deviates from the angle normal to the surface. Accordingly, to present an undistorted image, a projector is often carefully positioned in a room at an angle perpendicular to a projection screen. Many times, the optimal projector position for a room imposes restrictions, for example, as to seating arrangements, viewing angles, etc. Inflexible projection systems can distract from a viewer's experience. As described herein, various exemplary technologies provide enhanced projection flexibility that can enrich content consumption.

SUMMARY

An exemplary method includes defining a model for an environment, projecting a laser image from a source to a surface of the environment, determining at least one vector parameter with respect to the source and the surface and correcting the laser image based on the model, an anti-keystoning algorithm and the at least one vector parameter. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
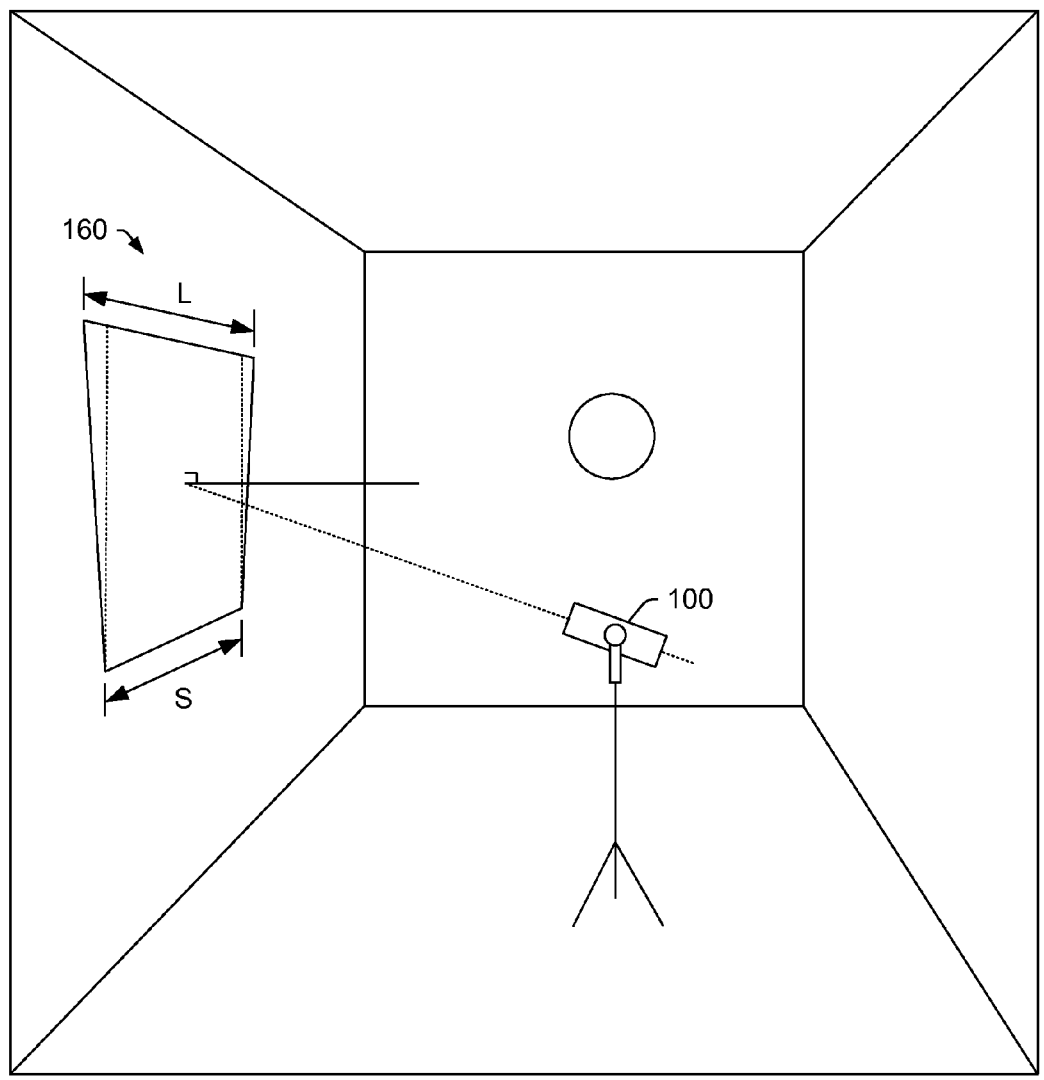
FIG. 1 is a diagram of a conventional projection system with a keystoned image.

FIG. 1 shows a conventional projector 100 in a cube-shaped room that projects an image 160 onto a wall where the angle of projection differs from the normal of the wall. As shown, the keystone effect causes the length of the top of the image to be longer than the length of the bottom of the image. In this example, the image has a long top side (L) and a short bottom side (S).

Figure 2:
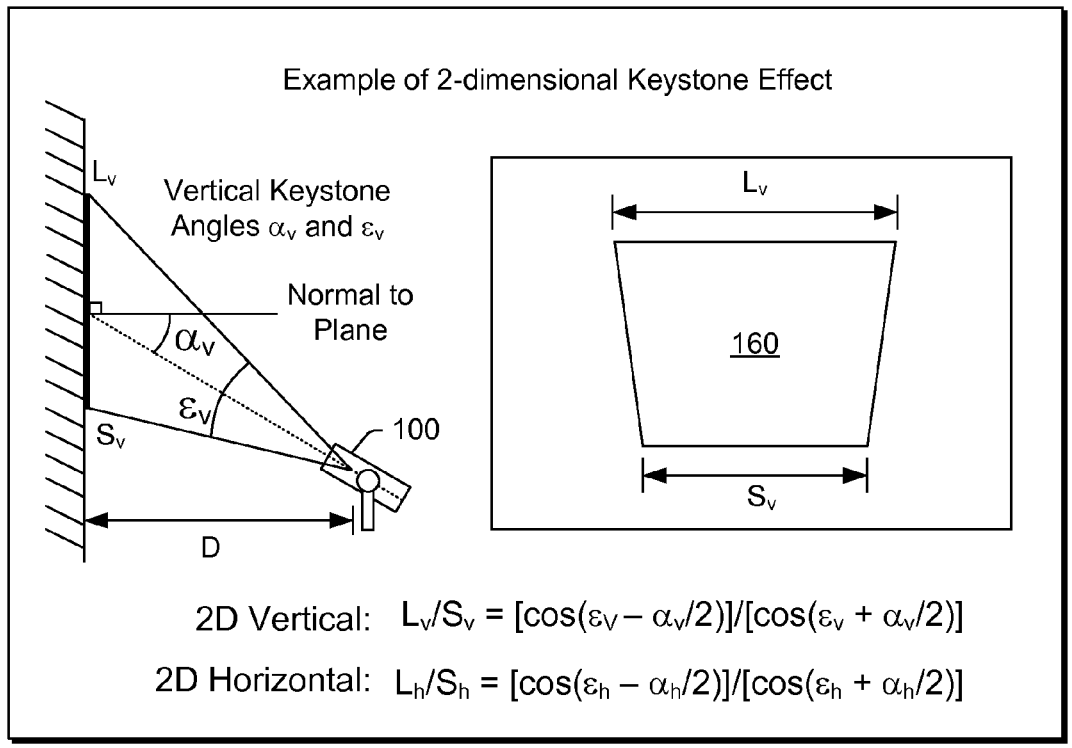
FIG. 2 is a diagram of keystoned images and some associated equations that approximate keystone effect distortion.
Figure 2:
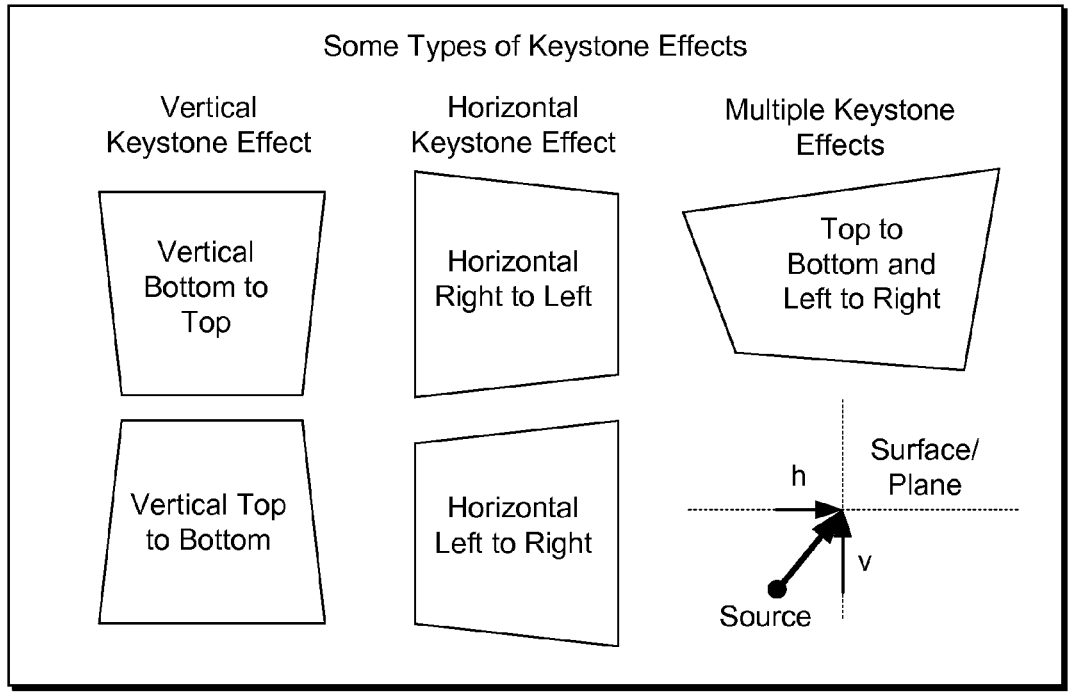

FIG. 2 shows the projector 100 and projected image 160 of FIG. 1 along with a vertical keystone equation and a horizontal keystone equation where each equation can approximate a distortion ratio of a length of a long side to a length of a short side of an image (e.g., $L_v$, $L_h$, $S_v$, $S_h$). In each of the keystone equations, the angle $\alpha$ represents a deviation between the projection angle and the normal of the projection surface and the angle $\epsilon$ represents a beam angle. In a two-dimensional example for vertical or horizontal displacement from a normal of the surface the image is being projected onto (e.g., normal at center of image), given the projection deviation angle and the beam angle, the distortion may be estimated by an appropriate one of the keystone equations. As indicated, a keystone effect may occur vertically, horizontally or along multiple directions. Where both vertical and horizontal displacements exist, then both equations may be used to correct image distortion. Further, as described herein, a roll angle may be optionally accounted for when deciding whether or how to correct image distortion.

Figure 3:
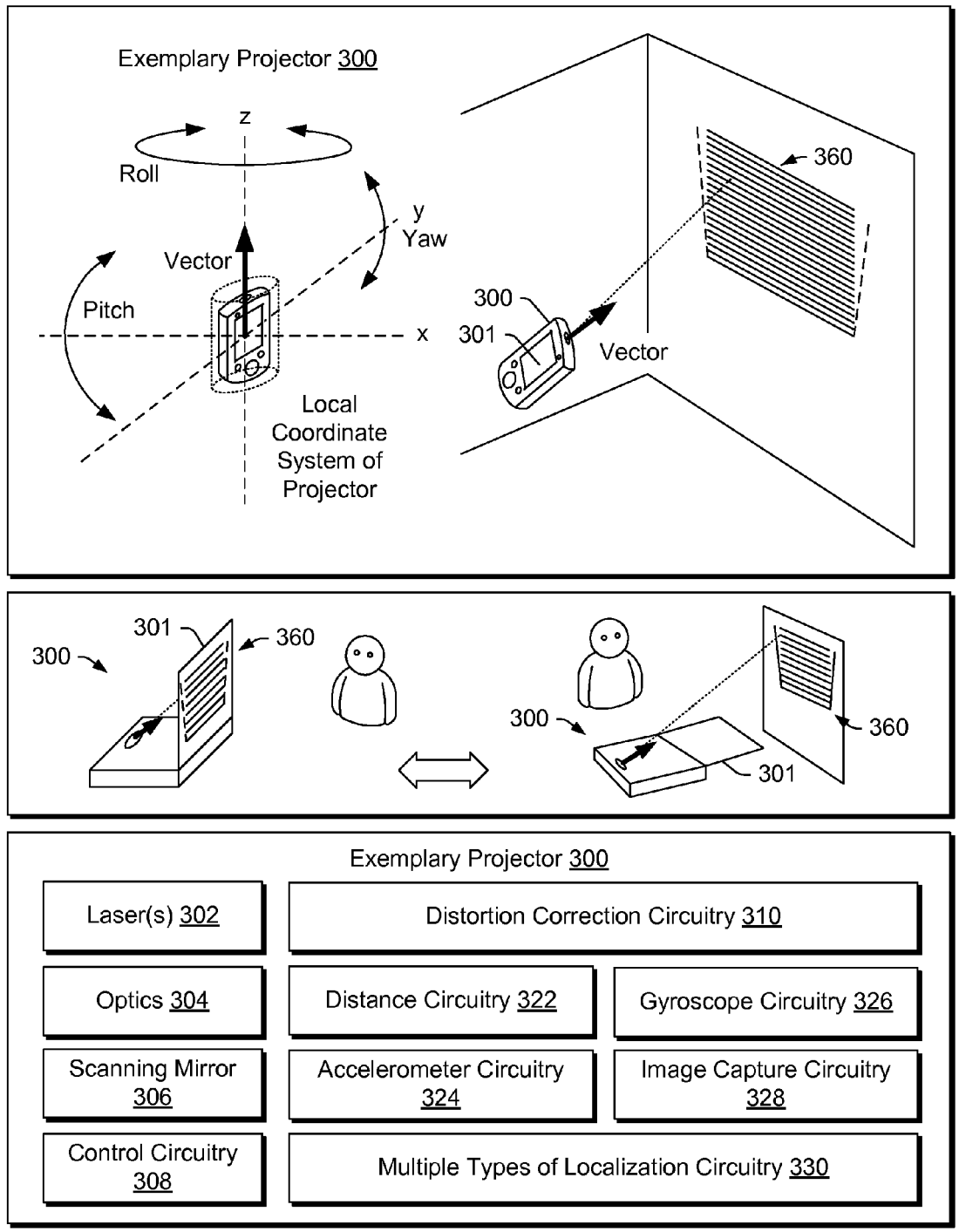
FIG. 3 is a diagram of an exemplary projector that includes distortion correction circuitry.

FIG. 3 shows two examples of an exemplary projector 300 in a local coordinate system and as projecting a distortion corrected image 360 onto an embedded screen or a projection surface. In the examples of FIG. 3, the exemplary projector 300 includes an embedded screen 301, one or more lasers 302, optics 304, a scanning mirror 306, control circuitry 308, distortion correction circuitry 310 and one or more types of circuitry that can provide localization information for use by the distortion correction circuitry 310. For example, the projector 300 may include distance circuitry 322, accelerometer circuitry 324, gyroscope circuitry 326, image capture circuitry 328 or multiple types of localization circuitry 330 (e.g., any combination of the foregoing types of circuitry).

In the example of FIG. 3, the local coordinate system of the projector 300 has an associated vector aligned along its z-axis, which may be an axis of projection associated with a center of a projected image. As described herein, localization information may include vector direction and vector magnitude (e.g., distance to a projection surface). As described herein, given a defined environment (e.g., a model of an environment), a field of view angle (e.g., equivalent of a beam angle) and information sufficient to determine the deviation angle (or angles) between the normal of a projection surface and a projection angle, the exemplary projector 300 can correct for keystone effect distortion using an anti-keystoning algorithm. While the equation of FIG. 2 is shown in two-dimensions, a three-dimensional anti-keystoning algorithm may be formulated and implemented by an exemplary projector (e.g., optionally using two 2D equations). Further, an exemplary method may optionally account for roll angle (see, e.g., pitch, yaw and roll).

As indicated in FIG. 3, the projector 300 can modulate one or more laser beams to project an image. Such a projector may project an image by scanning a pixel at a time (e.g., akin to an electron beam of a CRT) or by optically spreading and then modulating a laser and scanning a line at a time (e.g., where the line is modulated in a manner akin to Digital Light Processing). Whether an image is projected via a pixel-by-pixel or a line scanning process, as described herein, an exemplary image distortion correction technique can adjust the scanning process to present a corrected image (e.g., corrected to account for keystone effect distortion). As described herein, projection may be front projection or back projection. A projector may include circuitry to account for front or back projection. Where a projector includes an embedded screen, such a screen may be configured for front projection or back projection.

As an example of an exemplary image correction method, consider registering a corner of a room where three planar surfaces meet and specifically where the corner is defined by a point where three edges meet. Such a registration process may capture an image of the corner, apply an edge detection technique to identify the three edges and then define a model of the environment. In this example, the three edges may become a Cartesian coordinate system of the model (e.g., X, Y, Z, optionally considered a global or environment coordinate system) where the origin is associated with a particular vector angle of the projector. Further, the projector may acquire a distance or vector magnitude from the projector to the corner. Given the corner-defined model, if the projector maintains its location in the environment and merely alters its vector angle, the new vector angle can be used in conjunction with the model to determine a relationship between the projected image and one of the planar surfaces (e.g., where the model provides the normal at the point where the vector intersects the planar surface). The relationship may rely on the angles described with respect to FIG. 2 and optionally a pair of two-dimensional anti-keystoning equations (see, e.g., vertical equation of FIG. 2) that can correct for a horizontal keystone effect and a vertical keystone effect. In instances where the projector changes its location in the environment, the projector may provide a vector angle and a vector magnitude to determine a relationship between the projected image and one of the planar surfaces. As described herein, a particular real-time correction method respond to a change in vector angle for a given projector location or a particular real-time correction method may respond to a change in projector location where such a change may include a change in vector angle.

A particular laser projector may include three lasers for red, green and blue (RGB) color components, respectively, where beams of the lasers can be combined using an optical component or components. In such an example, the combined beam can be directed to a scanning mirror. To project an image, control circuitry controls the scanning mirror to generate each pixel of the image. As described herein, exemplary distortion correction circuitry can assist in controlling a scanning mirror, for example, to correct an image for keystone effect distortion. Such circuitry may be configured to receive localization information (e.g., vector information) and correct for image distortion in real-time. Accordingly, an exemplary laser projector may be manipulated in real-time, within an environment, to project a distortion corrected image onto a surface of the environment.

As mentioned, the projector 300 includes an optional embedded screen 301. As described herein, a projector with one or more embedded screens may include dual or multiple modes that account for projection to one or more embedded screens and for projection to a surface of an environment. Depending on the configuration of an embedded screen with respect to its source, some distortion of an image projected on the embedded screen may occur. As shown in FIG. 3, in one mode, the projector 300 may project to an embedded screen 301 with distortion correction as appropriate while in another mode (e.g., where the embedded screen is closed or otherwise repositioned), the projector 300 can project to an external projection surface with distortion correction. In another mode, a projector may project to both an embedded screen and an external projection surface where distortion correction occurs for images projected to both, as appropriate. The projector 300 may include circuitry that adjusts an image for front projection or back projection (e.g., where projection of an image on an embedded screen relies on back projection and where a change occurs to project the image via front projection onto a surface of an environment).

Figure 4:
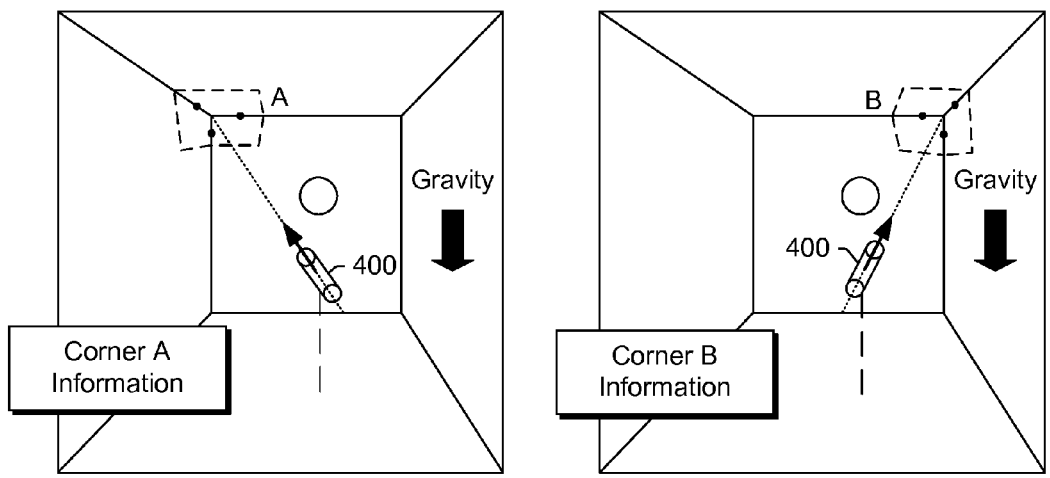
FIG. 4 is a diagram of exemplary techniques for defining a model for an environment for purposes of distortion correction.
Figure 4:
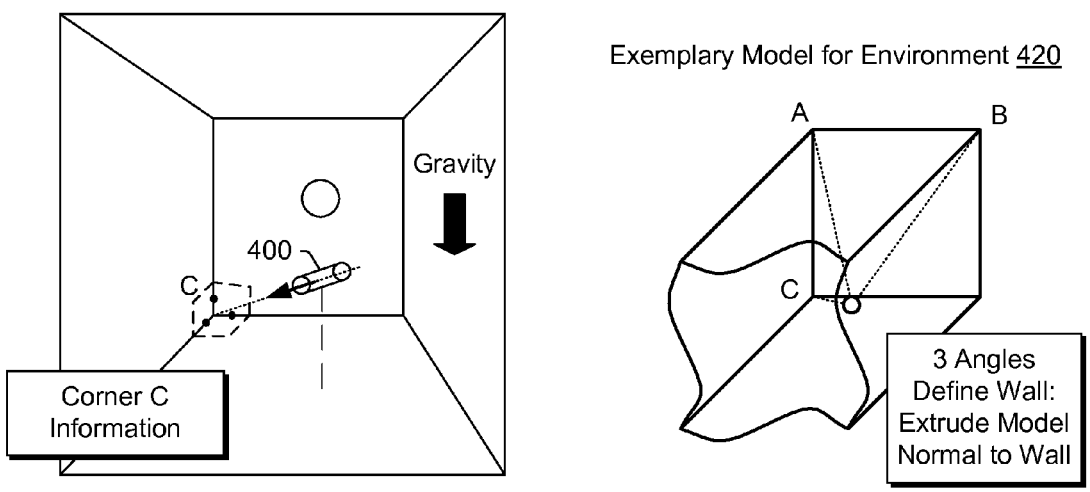

FIG. 4 shows a projector 400 along with an exemplary definition process 410 to define a model 420 for an environment. The definition process 410 may rely on one or more analysis techniques 430. The example of FIG. 4 shows a technique for direction analysis via one or more orientation sensors 434 and a technique for image feature analysis via one or more image sensors 438. For example, the technique 434 may rely on one or more of the distance circuitry 322, the accelerometer circuitry 324 and the gyroscope circuitry 326 of FIG. 3 while the technique 438 may rely on the image capture circuitry 328 of FIG. 3. In the example of FIG. 4, the defined model 420 for the environment may be based on the technique 434, the technique 438, a combination of techniques, etc.

As to the technique 434, a user may aim the projector 400 successively at corner A, B and C of the environment. At each corner, localization circuitry may register a vector direction where three vector directions and a distance define a plane (e.g., a back wall of the environment). In this example, the distance may be approximated by a chest-high distance of an average human holding the projector 400 or the distance may be acquired as a magnitude for one of the vectors. In another example, a user may aim the projector 400 at three edges that form a corner and assume or acquire a distance. In this example, given the localization information and assuming a cube-shaped model for the environment, a model for the environment may be defined. While two examples have been given, various other examples exist where localization information is acquired and optionally assumptions are made.

As to the technique 438, a user may aim the projector 400 at a corner and capture an image. By edge detection, the corner of the environment may be defined by a model. Where such an image capture occurs in conjunction with a distance measurement (e.g., a focus measurement), three surfaces of a cube-shaped environment may be defined. Where the process is repeated for another corner, four surfaces may be defined. Similarly, as more localization information is acquired, more surfaces of the environment may be defined by a model.

As indicated in FIG. 4, the model 420 for the environment may rely on assumptions such as a cube shape. In such an example, where a single wall has been localized, four additional walls may be defined, at least in part, via an extrusion of the single wall (e.g., extrusion in a direction normal to the wall surface).

Figure 5:
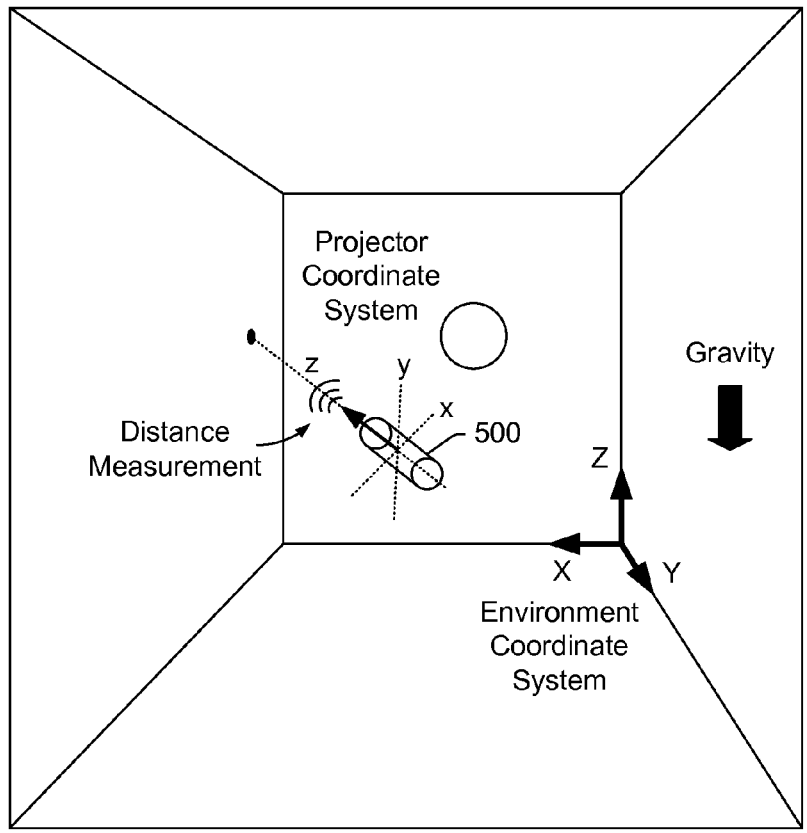
FIG. 5 is a diagram of an exemplary method for correcting image distortion.
Figure 5:
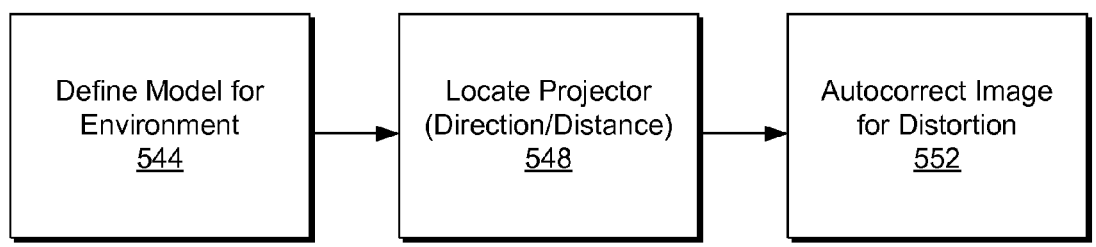

FIG. 5 shows an exemplary projector 500 with respect to a local projector coordinate system and an environment coordinate system (e.g., and gravity) along with an exemplary method 540. In the example of FIG. 5, the projector 500 includes localization circuitry to determine direction and localization circuitry to determine distance. The method 540 includes a definition block 544 for defining a model for an environment, for example, as explained with respect to FIG. 4. As shown, the method 540 includes a location block 548 for locating the projector using direction and distance information (i.e., localization information). Based on the model for the environment and the localization information, per a correction block 552, the method 540 includes automatically correcting an image for distortion.

In the example of FIG. 5, a user may aim the projector 500 at any of the model-defined surfaces of the environment where the projector 500 automatically corrects (in real-time) the projected image to account for distortion due to the keystone effect. Further, the user may move in the environment as the local coordinate system of the projector is tracked with respect to the coordinate system of the environment. In such an example, a user may hold a handheld projector and walk throughout the environment while maintaining an image on a particular surface or projecting the image onto any of the surfaces of the defined environment. In this example, where the user is a presenter, significant flexibility is added (e.g., the presenter may field a question from an audience member and project an image on a surface near that audience member to assist with an answer to the question).

Figure 6:
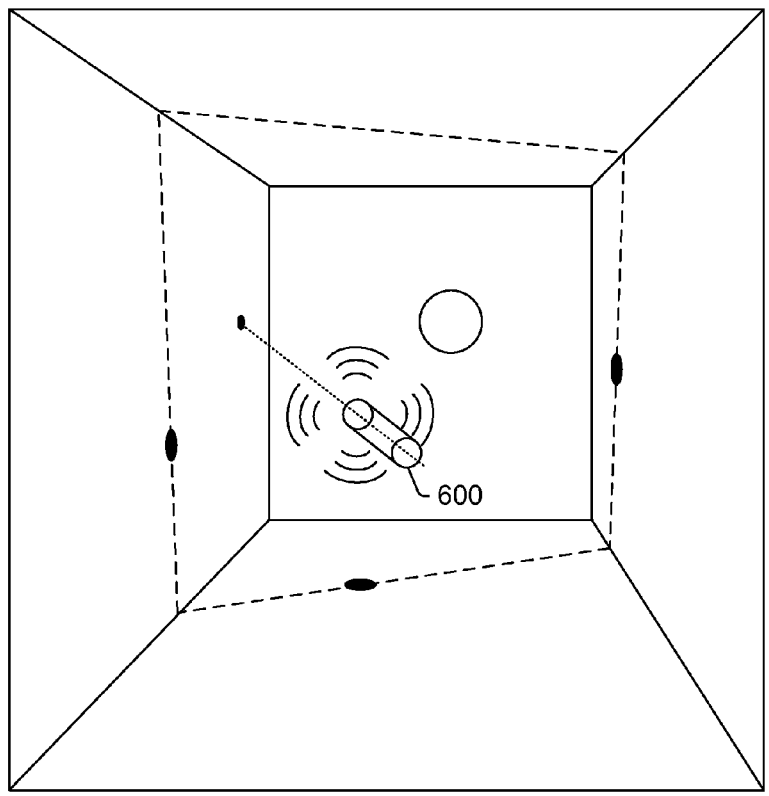
FIG. 6 is a diagram of an exemplary method for correcting image distortion.
Figure 6:
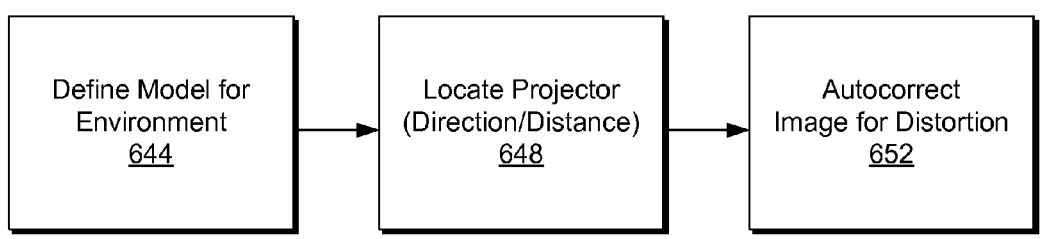

FIG. 6 shows an exemplary projector 600 that includes distance circuitry along with an exemplary method 640. The method 640 includes a definition block 644, a location block 648 and a correction block 652. Per the definition block 644, the method 640 defines an environment, for example, to provide a model for use with a distortion correction algorithm. Per the location block 648, the method 640 locates the projector 600 by acquiring distance information. As shown in the example of FIG. 6, the projector 600 includes circuitry to determine distances between the projector 600 and several walls of the environment. Specifically, where orthogonal distances to three walls are known, a projection plane may be defined for the projector 600 to thereby locate the projector. Given a model that defines the environment and the projection plane, per the correction block 652, the method 640 may automatically correct a projected image for account for distortion such as keystone effect distortion.

Figure 7:
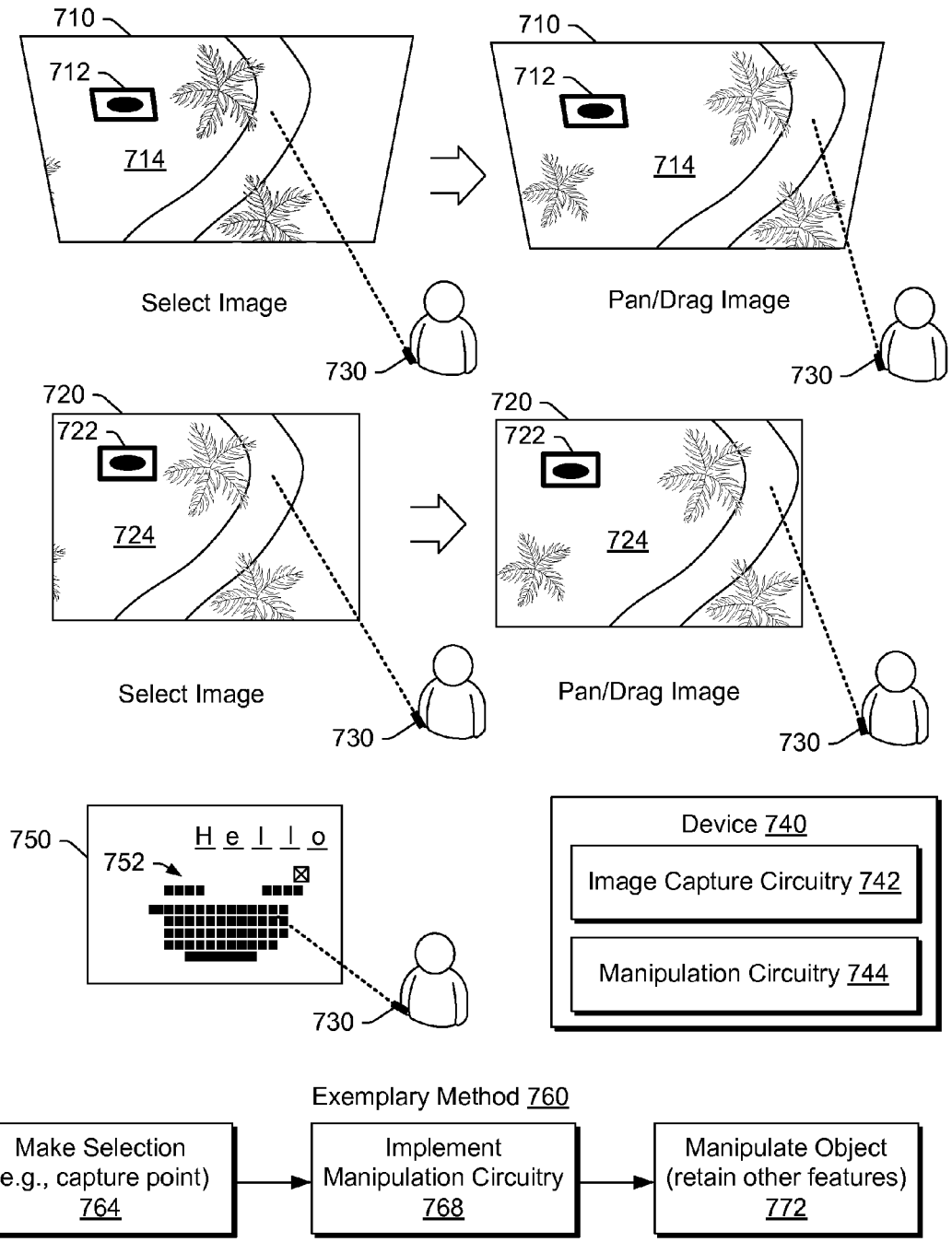
FIG. 7 is a diagram of an exemplary selection device and method for manipulating projected images.

FIG. 7 shows a distorted image scenario 710 and a corrected image scenario 720 along with an exemplary method 760 for manipulating an object in a projected image. According to the method 760, per a selection block 764, a user makes a selection of an object in a projected image. For example, in the scenarios 710, 720, the user points a pointing and selecting device 730 at a background image 714 or 724. A selection may occur via a device 740 that include image capture circuitry 742 (e.g., to locate a projected marker), via localization circuitry (e.g., at least partially built into the device 730 to determine a direction with respect to a projected image) or a combination thereof. Per an implementation block 768, the device 740 (e.g., a projector) implements manipulation circuitry 744, which may include executing one or more software or firmware instructions. For example, the projector may lock onto a location of a point selected using the pointer. Per a manipulation block 772, the implemented manipulation circuitry 744 may track movement of a marker or the pointing device 730 and manipulate the selected object in response to the movement.

As shown in the scenarios 710, 720, a user selects a point on the background image 714 or 724 using the device 730 and then drags the image to the right by moving the device 730. In this example, a control object 712 or 722 remains stationary in the projected field of view (FOV). In another example, the user may select the control object 712 or 722 and cause some action to occur (e.g., play a song, display another image, etc.). For example, in a scenario 750, an image of a keyboard 752 is projected onto a surface. A user can manipulate the device 730 and image capture circuitry 742 may register a bright spot of a certain color on the projected image with a control feature (e.g., a key of the keyboard 752), In the scenario 750, a user may type a word using the keyboard (e.g., "hello"). As described herein, image capture circuitry 742 may identify or otherwise register a marker and manipulation circuitry 744 may issue a command such as a keystroke command. In the scenario 750, a user may be able to select the image of the keyboard 752 and cause it to move to a different location, change shape, disappear or change transparency, etc. (e.g., while a background image and optionally other displayed objects remain positioned). While the scenario 750 shows a keyboard, a menu or other type of control feature may be projected and controlled.

As described herein, the device 730 may allow for zooming, panning, scrolling, distortion correcting, defining boundaries, changing view perspective (e.g., tilting) display of an image. With respect to zooming, the device 730 may be used to circle or outline a portion of a projected image and then zoom in and display the selected portion. As described herein, "image" includes video images. Accordingly, the device 730 may allow for pausing video, fast-forwarding video, rewinding video, display of a menu over video, etc.

As described herein, an exemplary method may include adjusting granularity of an image based at least in part on localization information. For example, as a projector is moved away from a projection surface, localization information may be input to a granularity control circuit that adjusts the number of pixels per inch of the projected image.

As described herein, various acts, steps, etc., can be implemented as instructions stored in one or more computer-readable media. For example, one or more exemplary computer-readable media can include computer-executable instructions to instruct a processor to: define a model for an environment, determine at least one vector parameter with respect to a laser image projected onto a surface of the environment, and correct the laser image based on the model, an anti-keystoning algorithm and the at least one vector parameter.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 8:
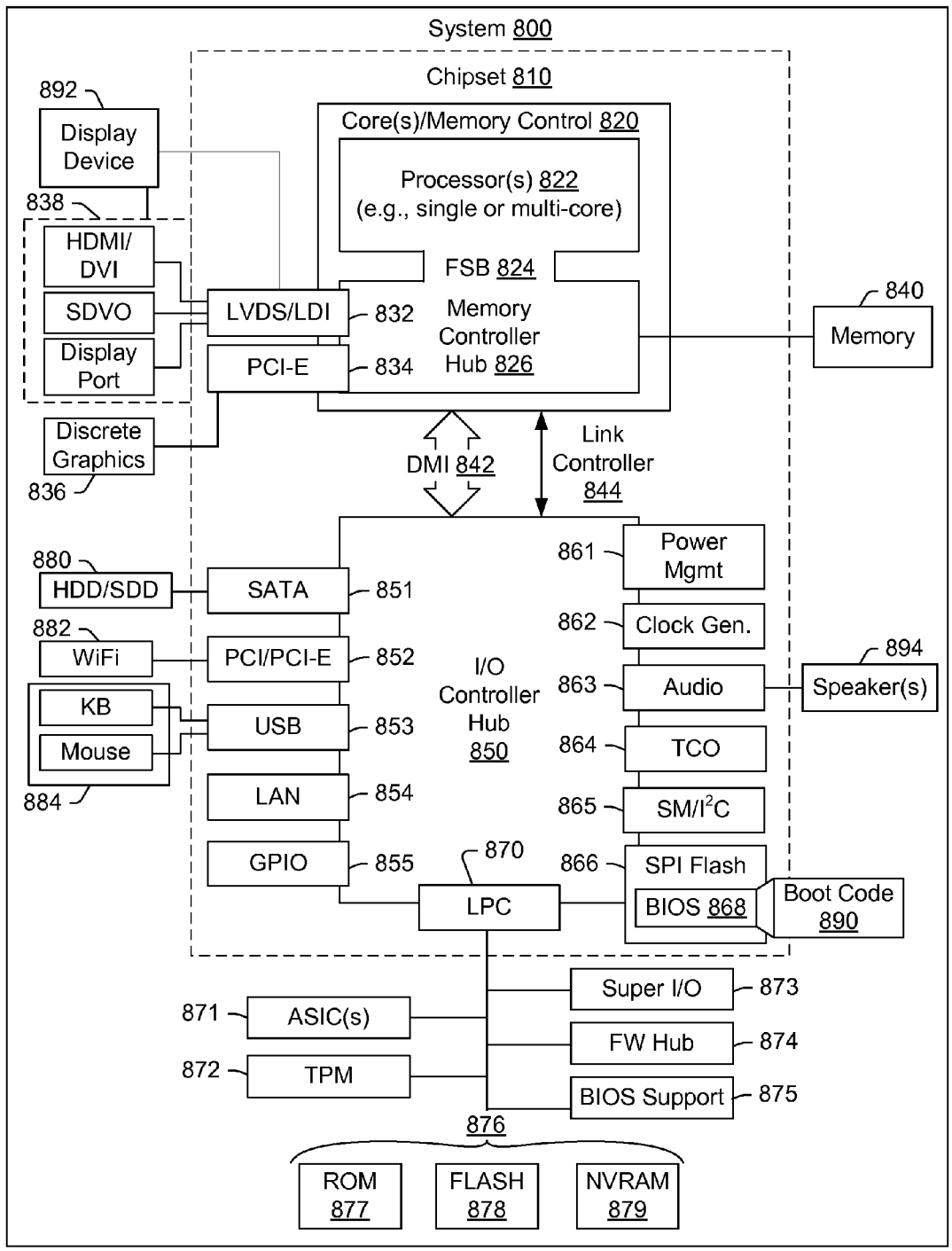
FIG. 8 is a diagram of an exemplary machine, which may be a client device, a server or other apparatus.

While various exemplary circuits or circuitry have been discussed, FIG. 8 depicts a block diagram of an illustrative exemplary computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. An exemplary system may include AGP or PCI-E for support of graphics.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for erasing, reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), mice and various other devices (e.g., cameras, phones, storage, media players, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, an exemplary device or other machine may include fewer or more features than shown in the system 800 of FIG. 8. For example, the projector 300 of FIG. 3 may include some or all of the features shown in the system 800 (e.g., as part of control circuitry 308).

CONCLUSION

Although exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. A method comprising:
capturing an image of a corner of an environment that comprises a plurality of surfaces;
based at least in part on the captured image, defining a model that models at least three different planar surfaces of the environment;
projecting a laser image from a source to one of the plurality of surfaces of the environment;
determining at least one vector parameter of a vector defined with respect to the source and the one surface to orient the source with respect to the model; and
correcting the laser image based on the model, an anti-keystoning algorithm and the at least one vector parameter of the vector.

2. The method of claim 1 wherein the at least one vector parameter comprises a vector angle.

3. The method of claim 1 wherein the at least one vector parameter comprises a vector magnitude.

4. The method of claim 1 wherein the defining the model comprises setting angles between at least two surfaces of the plurality of surfaces of the environment.

5. The method of claim 1 further comprising, for a different projection angle between the source and the one surface, determining at least one vector parameter of a vector defined with respect to the source and the one surface for the different projection angle, and correcting the image based on the model, the anti-keystoning algorithm and the at least one vector parameter for the vector for the different projection angle.

6. The method of claim 5 wherein the different projection angle corresponds to an adjustment to the position of the source in the environment responsive to one or more computing instructions.

7. The method of claim 1 wherein the projecting comprises projecting the laser image from the source using multiple lasers.

8. The method of claim 1 wherein the projecting comprises projecting the laser image from the source using a scanning mirror.

9. The method of claim 8 further comprising controlling the scanning mirror to project the corrected laser image.

10. The method of claim 1 further comprising projecting a laser image from a source to a surface of an embedded screen and correcting the laser image based on a position of the embedded screen and an anti-keystoning algorithm.

11. The method of claim 10 wherein the projecting a laser image from a source to a surface of an embedded screen comprises front projection or back projection to the surface of the embedded screen.

12. The method of claim 1 wherein the laser image comprises a moving picture image.

13. The method of claim 1 further comprising registering a marker projected from a pointing device with respect to the corrected laser image and executing an instruction based on the registering.

14. The method of claim 13 wherein the registering registers the marker with respect to a control graphic of the corrected laser image.

15. An apparatus comprising:
source lasers configured to project an image;
localization circuitry that comprises image capture circuitry;
one or more processors;
control circuitry configured to
  detect edges in a captured image of a corner of an environment that comprises a plurality of surfaces;
  based at least in part on the detected edges, define a model for the environment that models at least three different planar surfaces of the plurality of surfaces of the environment;
  localize the source lasers with respect to at least one of the modeled surfaces of the environment; and
  correct an image projected from the source lasers to one of the modeled surfaces of the environment based on the model, the localization of the source lasers and an anti-keystoning algorithm.

16. The apparatus of claim 15 wherein the localization circuitry comprises at least one member of a group consisting of gyroscopic circuitry, magnetometer circuitry and range-finding circuitry.

17. The apparatus of claim 15 further comprising a scanning mirror operable in conjunction with the control circuitry to project a corrected image from the source lasers to the one of the modeled surfaces.

18. A system comprising:
source lasers configured to project an image;
localization circuitry that comprises image capture circuitry;
a pointing device;
one or more processors; and
control circuitry configured to
  detect edges in a captured image of a corner of an environment that comprises a plurality of surfaces;
  based at least in part on the detected edges, define a model for the environment that models at least three different planar surfaces of the plurality of surfaces of the environment;
  project an image from the source lasers to one of the modeled surfaces of the environment;
  localize the source lasers with respect to at least one of the modeled surfaces of the environment;
  correct an image projected from the source lasers to the one of the modeled surfaces of the environment based on the model, the localization of the source lasers and an anti-keystoning algorithm;
  register a marker of the pointing device with respect to the corrected image using at least the localization circuitry; and
  execute an instruction by at least one of the one or more processors based on the registration of the marker.

19. The system of claim 18 wherein the localization circuitry comprises at least one member of a group consisting of gyroscopic circuitry, magnetometer circuitry and range-finding circuitry.

20. The method of claim 1 further comprising detecting edges in the captured image.

21. The method of claim 20 wherein the detecting edges detects three edges that define a Cartesian coordinate system for the model.

22. A method comprising:
locating at least three corners of a wall in an environment;
defining a model of the environment by extruding the wall to define additional walls of the environment;
projecting a laser image from a source to one of the walls of the environment;
determining at least one vector parameter of a vector defined with respect to the source and the one wall to orient the source with respect to the model; and
correcting the laser image based on the model, an anti-keystoning algorithm and the at least one vector parameter of the vector.

23. The method of claim 22 wherein the extruding extrudes the wall in a direction normal to a surface of the wall.

* * * * *